United States Patent [19]

Kawaguchi et al.

[11] 4,174,029
[45] Nov. 13, 1979

[54] DEVICE FOR SUPPLYING LINEAR MATERIALS

[75] Inventors: Hikotarou Kawaguchi, Sakura; Hisawo Kobayashi, Funabashi, both of Japan

[73] Assignee: Kao Soap Co., Ltd., Tokyo, Japan

[21] Appl. No.: 923,148

[22] Filed: Jul. 10, 1978

[30] Foreign Application Priority Data

Jul. 25, 1977 [JP] Japan .................................. 52/99114

[51] Int. Cl.² ............................................. B65G 47/26
[52] U.S. Cl. .................................... 198/431; 53/148; 198/608; 198/614; 221/237; 414/52; 414/745
[58] Field of Search ............... 198/431, 480, 481, 608, 198/418, 426, 614, 429; 221/237, 266; 53/148; 414/745, 106, 107, 69, 86, 47, 52

[56] References Cited

U.S. PATENT DOCUMENTS

| 2,884,114 | 4/1959 | Obergelland | 198/429 |
| 2,905,341 | 9/1959 | Anderson | 414/107 X |
| 4,053,066 | 10/1977 | Lynch | 198/431 |

Primary Examiner—Robert B. Reeves
Assistant Examiner—Douglas D. Watts
Attorney, Agent, or Firm—Blanchard, Flynn, Thiel, Boutell & Tanis

[57] ABSTRACT

Linear objects are removed from a processing drum, one at a time and are deposited to form groups or bundles of said objects in the slots of a transfer drum. Then the groups or bundles of said objects are pushed out of the slots in the transfer drum for feeding same to another apparatus.

6 Claims, 5 Drawing Figures

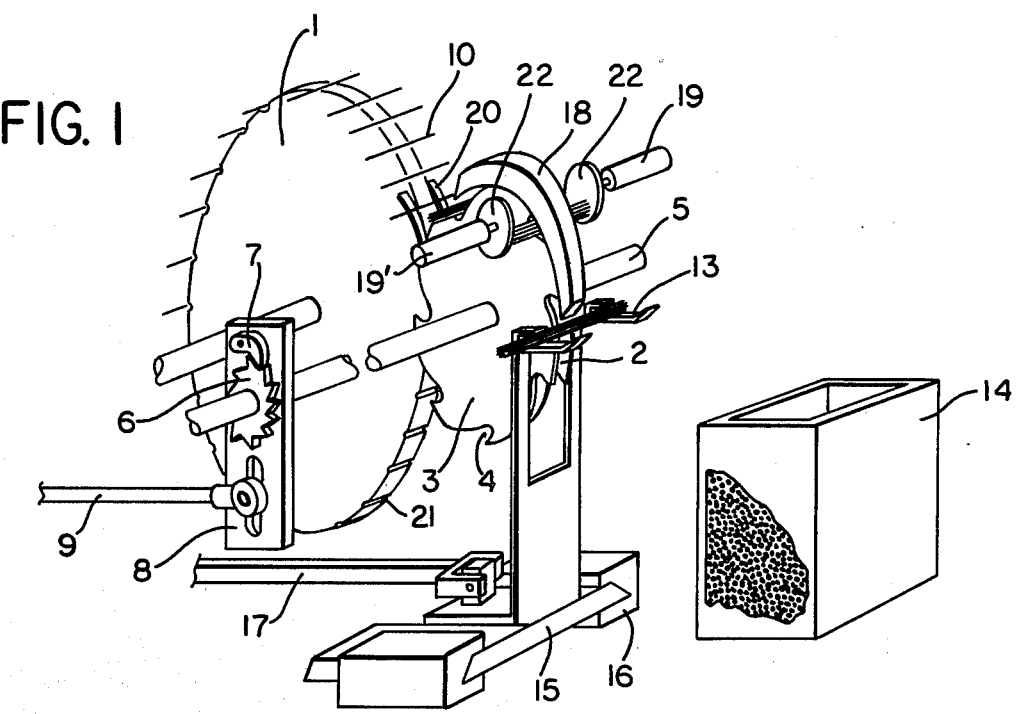
FIG. 1
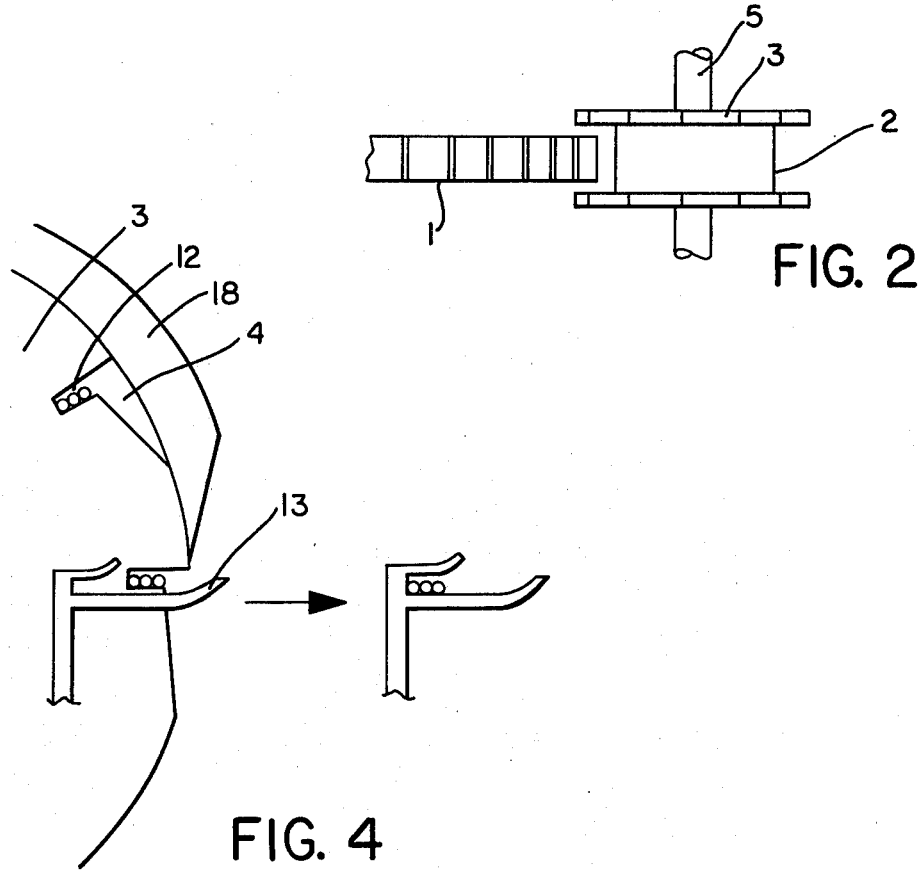
FIG. 2
FIG. 4

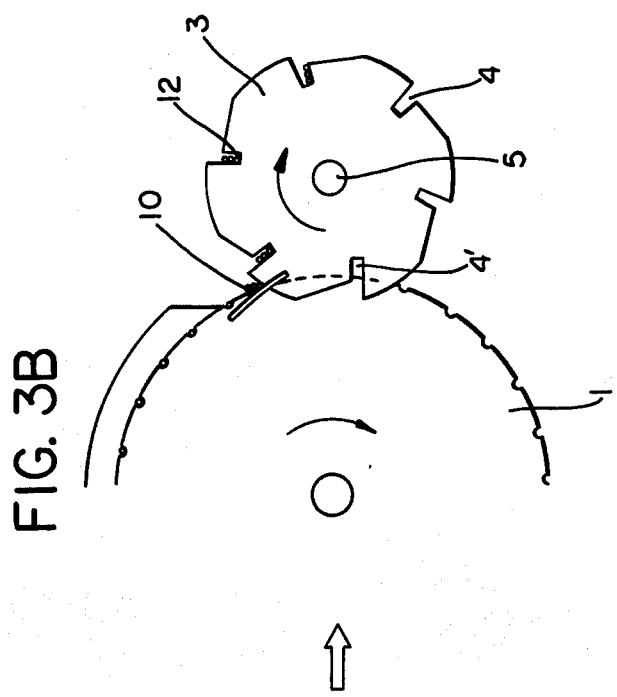
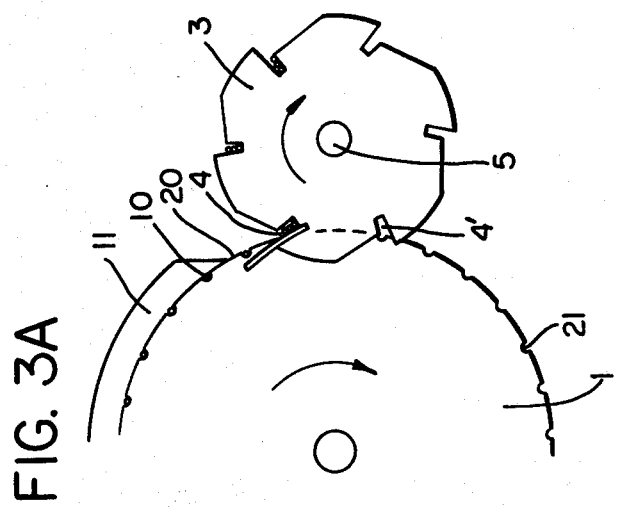
FIG. 3B
FIG. 3A

4,174,029

DEVICE FOR SUPPLYING LINEAR MATERIALS

BACKGROUND OF THE INVENTION

1. Field of the Invention

This invention relates to an apparatus for automatically supplying linear objects.

2. Description of the Prior Art

Linear filament-like objects made of synthetic resin or natural material are used as bristles for articles such as hair brushes, tooth brushes, clothes brushes and the like. The tips of linear objects used for such articles are often processed by treating the tips with heat so that the tips become rounded or semi-spherical in shape or the tips are coated with chemicals in order to modify the linear objects.

An apparatus for such processing of linear objects comprises a rotatable drum having grooves on its circumference, wherein each object is held in a groove during processing. An apparatus of this type is capable of processing the linear materials, but it is not capable of feeding the objects to the subsequent step of the manufacturing process. In practical manufacturing operations, it is necessary to supply the processed linear objects to a subsequent step, such as to a bristle-pegging machine.

Most of the linear objects used for making the above-mentioned articles are very light in weight and are difficult to feed by a conventional chute feeder because they become charged with static electricity. An apparatus is available for processing the tips of the linear objects and feeding them to the subsequent step, in which grooves are formed on the upper surface of a plate, each of the linear objects is held in a groove while the plate is reciprocated, and the linear objects being processed are directly supplied to a hopper of the subsequent step. With this apparatus, however, the linear objects have to be separated into individual lines in order directly to process their tips, and this causes a problem of performing the manufacturing operation at a high speed.

It is the purpose of this invention, therefore, to provide an apparatus for supplying linear objects at high speeds, continuously and efficiently, and overcoming the aforementioned disadvantages.

BRIEF DESCRIPTION OF THE DRAWINGS

FIG. 1 is a perspective view showing an embodiment of the apparatus of this invention.

FIG. 2 is a partial top view showing the arrangement of the drum 1 and the drum 3.

FIG. 3(a) and FIG. 3(b) are diagrammatic views illustrating the state in which the linear materials are transferred from the processing drum.

FIG. 4 is a diagrammatic view illustrating the transfer pusher.

According to this invention, the apparatus for supplying linear materials comprises a rotatable disc or drum 1 having on its periphery a plurality of circumferentially spaced grooves 21 for holding linear objects in a horizontal position. There is provided a second rotatable disc or drum 3 having on its periphery a plurality of circumferentially spaced slots 4. The slots 4 have a depth sufficient for holding a plurality of linear objects therein in a horizontal position. The drums 1 and 3 are arranged so that a portion of the circumference of the drum 1 is received within a cavity 2 on the circumference of the drum 3. The drum 3 is intermittently rotated in a stepwise fashion. A pusher 13 is arranged to reciprocate so that the linear objects held in the slots 4 are pushed outwardly beyond the circumference of said drum 3 while the drum 3 is stopped.

The apparatus of the invention is described in detail below with reference to the accompanying drawings.

Referring to FIG. 1, the grooves 21 are formed on the peripheral surface of a drum 1 with a predetermined circumferential spacing therebetween. One linear object 10 is held in each of the grooves 21.

Referring to FIG. 2, the drum 3 has a circumferential recess 2 which is of greater axial dimension than the axial thickness of the drum 1. The drum 3 is installed so that a portion of its periphery overlaps a portion of the periphery of the drum 1, and the overlapping part of the outer periphery of the drum 1 extends into the cavity 2 of the drum 3 and is capable of rotation therein. The overlapping part of the outer periphery of the drum 1 that projects into the cavity 2 on the circumference of the drum 3 is located on a downwardly moving part of the drum 1 and it extends into the cavity 2 at a location on an upwardly moving part of the drum 3. The drum 3 is mounted on a shaft 5. As shown in FIG. 3 and FIG. 4, the drum 3 is formed on its outer periphery with relatively deep slots 4, the inner ends of which are in the form of a relatively narrow slit and the outer end of the slit has an outwardly flaring side wall on the leading side of the slot 4. Thus, the slots 4 have an oblong cross section, and the side walls on the front or leading sides, in the direction of movement of the slots 4, are flared so that the widths of the slots increase toward the outer ends thereof.

On the shaft 5 there is rotatably mounted an oscillatable plate 8 and on said plate there is pivotally mounted a one-way driving pawl 7. The pawl 7 is engageable with a ratchet wheel 6 which is fixed to the shaft. Thus, the shaft 5 is rotated in a unidirectional stepwise fashion in response to oscillation of the plate 8. The oscillatable plate 8 is oscillated at a predetermined period by a link 9 in order to intermittently rotate the drum 3 in a stepwise fashion. Although not shown, the link 9 can be driven by an air cylinder or the like.

The tips of the linear objects 10, each of which is held in a groove 21 of the drum 1, are treated while the drum 1 rotates (the treatment apparatuses are not shown).

The treated linear objects 10, as shown in FIG. 3(a), are caused to fall into the slots 4 of the drum 3 by means of a pair of take-up guides 20, while the drum 1 is rotating. It is desirable to mount a retainer 11 adjacent the outer peripheral portion of the drum 1 so that the objects 10 cannot be disengaged from the grooves 21 of the drum until the predetermined discharge position is reached. The guides 20 are mounted in a stationary position by a suitable support, not shown, and they are positioned so that their upper surfaces extend substantially parallel to the positions of the lower walls of the slots 4 as the slots reach said guides. A plurality of linear objects fall into each of the slots 4 because the drum 3 rotates stepwise intermittently, owing to the operation of the ratchet wheel 6, ratchet pawl 7 and the oscillator plate 8. As shown in FIG. 3(b), the linear objects 10 fed by the drum 1 while the drum 3 is moving are supported at the crossing point of the circumferential line of the drum 3 and the circumferential line of the drum 1, and they are caused to fall into the next following slot 4' when said slot 4' reaches the predetermined discharge position. The linear objects 10 that fall into the slot 4 are held in the narrow inner slit portion 12 of the slot 4. The depth and width of the slit 12 are determined depending on the speed of the drum 1 and the speed of the drum 3.

Referring now to the operation for discharging the objects 10 from the drum 3, the timing of the intermittent rotation of the drum 3 is so set that the drum 3 is halted at a position at which the slit portion 12 of the slot 4 is substantially horizontal, as shown in FIG. 4. The linear objects in the slot 4 at the discharge station for drum 3 are moved horizontally and are deposited into a hopper 14 for the apparatus of the next processing step by means of the pusher 13 while the drum 3 is at rest. The pusher 13 is mounted on a slide plate 15 which is engaged with a slide guide 16. The pusher 13 is reciprocated by means of a link 17 mounted on the slide plate 15. Although not shown, the link 17 can be actuated by means of an air cylinder or the like. Collision of the linear objects 10 against the pusher 13 is prevented by timing the intermittent rotation of the drum 3 and timing of the reciprocal motion of the pusher 13 by means of a cam or the like. It is recommended to mount a retainer 18 on the outer periphery of the drum 3 so that the linear objects are retained in the slots 4, until they reach the discharge position, without being disengaged from the slots 4 even if an impact is applied thereto during turning of the drum 3.

As shown in FIG. 4, the upper end of the pusher 13 has the shape of a sidewardly opening channel, in which the outer ends of the upper and lower legs are bent slightly upwardly. The upper leg is shorter than the lower leg so that the linear objects can be received on the lower leg, and the lower leg works so that the linear objects are not disengaged from the pusher when they are being handed from the slot 4 over to the pusher 13. Further, the clearance between the upper and lower legs of the pusher is slightly greater than the width of the slit 12, so that the linear objects are reliably taken out by the pusher 13. The pusher 13 is divided into two portions so as to be located on both axial sides of the drum 3, and each portion is formed in the sidewardly opening channel shape as described above. While the linear objects 10 are being fed to the position of the pusher 13 by the drum 3, positioning devices 22 correct the axial positions of the linear objects at timed intervals while the drum 3 is halted during the intermittent motion of the drum 3. The positioning devices 22 engage opposite ends of the objects and they are operated by suitable means, such as air cylinders 19, 19', so that the linear objects are properly positioned with respect to the axial width of the drum 3. According to the apparatus of this invention as mentioned in the foregoing, the linear objects carried on the processing drum 1 are continuously supplied to the next step without requiring any assistance by a worker. Further, even when the linear objects are being pushed by the pusher 13, there is no need to separate them into single objects; rather, the linear objects are pushed in the form of a bundle making it possible to supply them at very high speeds.

The embodiments of the invention in which an exclusive property or privilege is claimed are defined as follows:

1. An apparatus for supplying linear objects, comprising:
   a processing drum mounted for rotation about a horizontal axis, said processing drum having a series of circumferentially spaced grooves on its periphery for holding linear objects in horizontal positions during processing thereof;
   a transfer drum mounted for rotation about a horizontal axis and means for effecting intermittent stepwise rotation of said transfer drum, said transfer drum having a series of circumferentially spaced slots on its periphery for receiving and holding a group of the linear objects in each slot, said transfer drum having a circumferentially extending recess in its periphery and said drums being arranged so that a portion of said processing drum extends into said recess so that the paths of travel of said grooves and slots intersect whereby the linear objects are transferred from said grooves to said slots; and
   a reciprocable pusher having a sidewardly opening channel-shaped cavity for receiving linear objects therein, said pusher being mounted in association with said transfer drum for pushing the group of linear objects out of each of the slots in succession and beyond the circumference of said transfer drum while said transfer drum is stationary during intermittent stepwise rotation thereof.

2. An apparatus according to claim 1 wherein a downwardly moving portion of said processing drum extends into said recess at a position located at an upwardly moving portion of said transfer drum.

3. An apparatus according to claim 2 wherein said pusher is located at a position adjacent a downwardly moving portion of said transfer drum and means for reciprocating said pusher in a substantially horizontal direction.

4. An apparatus according to claim 1 in which said slots are elongated in a direction transverse to the axis of rotation of said transfer drum and the outer end portion of the leading side wall of each slot flares outwardly relative to the trailing side wall of the slot so that said slots are wider at their outer ends.

5. An apparatus according to claim 1 wherein said means for effecting stepwise rotation of said transfer drum comprises an oscillatable plate rotatably mounted on the shaft of said transfer drum, a one-way driving pawl mounted on said oscillatable plate and a ratchet fixed to said shaft and engaged with said pawl so as to index said shaft in response to oscillation of said plate.

6. An apparatus according to claim 1, wherein said processing drum is mounted for continuous rotation, said processing drum and said transfer drum are mounted for rotation in the same direction about parallel horizontal axes which are substantially coplanar, the downwardly moving portion of the periphery of said processing drum being mounted in radially opposed relation to the upwardly moving portion of the periphery of said transfer drum substantially in the plane of said axes of rotation, guide members positioned above the bight defined by said drums for directing linear objects from said grooves into said slots, retainer members positioned above said drums and extending from adjacent the bight circumferentially partway around said drums to retain said linear objects in said grooves and slots, positioning means disposed adjacent the upper portion of said transfer drum for engaging and positioning the ends of the linear objects in said slots, said pusher being located adjacent said transfer drum at a position substantially diametrically opposite from the position at which said processing drum extends into said recess in said transfer drum, said cavity being defined by a relatively long lower wall extending substantially radially of said transfer drum and beyond the periphery thereof and a relatively short upper wall extending parallel with said lower wall substantially radially of said transfer drum and terminating at a position which is spaced radially inwardly of the inner ends of said slots as they approach said pusher whereby the group of linear objects in each slot can be deposited on said lower wall.

* * * * *